United States Patent
Riley et al.

(10) Patent No.: US 6,986,948 B2
(45) Date of Patent: Jan. 17, 2006

(54) POLYESTER-BASED DIMETHACRYLATES DESIGNED FOR LAMINATING APPLICATIONS

(75) Inventors: Daniel Joseph Riley, Dublin, OH (US); Roman Loza, Dublin, OH (US)

(73) Assignee: Ashland, Inc., Covington, KY (US)

( * ) Notice: Subject to any disclaimer, the term of this patent is extended or adjusted under 35 U.S.C. 154(b) by 355 days.

(21) Appl. No.: 10/274,589

(22) Filed: Oct. 21, 2002

(65) Prior Publication Data

US 2004/0076830 A1 Apr. 22, 2004

(51) Int. Cl.
*B32B 27/36* (2006.01)

(52) U.S. Cl. .................... 428/483; 428/413; 428/414; 428/480; 428/295.1; 428/297.4; 428/297.1; 428/300.7; 428/301.4; 525/48; 525/49; 525/438; 525/445; 156/327; 156/331.1

(58) Field of Classification Search ............... 428/413, 428/414, 480, 483, 295.1, 297.4, 291.1, 300.7, 428/301.4, 113, 114, 190; 525/48, 49, 438, 525/445, 31; 156/327, 331.1; 523/205, 215, 523/217, 400; 524/80, 81, 599; 442/59, 164, 442/172, 238, 250

See application file for complete search history.

(56) References Cited

U.S. PATENT DOCUMENTS

| | | | | | |
|---|---|---|---|---|---|
| 4,052,280 | A | * | 10/1977 | McGinnis | 522/33 |
| 5,373,058 | A | * | 12/1994 | Hager et al. | 525/168 |
| 5,412,010 | A | * | 5/1995 | Cowley et al. | 524/109 |
| 5,747,607 | A | * | 5/1998 | Hager et al. | 525/445 |
| 6,414,085 | B1 | * | 7/2002 | Karas et al. | 525/168 |
| 6,583,218 | B1 | * | 6/2003 | Airola et al. | 525/25 |

* cited by examiner

*Primary Examiner*—David J. Buttner
*Assistant Examiner*—Christopher Keehan
(74) *Attorney, Agent, or Firm*—Mueller and Smith, LPA

(57) ABSTRACT

A laminate formed from a first fiber-reinforced ply joined by a laminating resin composition to a second fiber-reinforced ply. The laminating resin composition is the cured residue of a polyester resin being end-terminated with an alkyl acrylate group and diluted with less than about 35 wt-% styrene. The first fiber-reinforced ply is laminated to the second fiber-reinforced ply with the laminating resin composition by coating a surface of the first ply with an adhesive composition. The coated first ply surface is joined with a surface of the second ply and the adhesive cured. In making the laminating resin composition, unreacted alkyl acrylate can be reacted with an epoxy to push the reaction to completion.

20 Claims, No Drawings

POLYESTER-BASED DIMETHACRYLATES DESIGNED FOR LAMINATING APPLICATIONS

CROSS-REFERENCE TO RELATED APPLICATIONS

None.

STATEMENT REGARDING FEDERALLY SPONSORED RESEARCH

Not applicable.

BACKGROUND OF THE INVENTION

The present invention relates generally to laminating resins, such as are used in tub, shower, and marine applications, and more particularly to a laminating resin low in styrene content for low VOC (volatile organic content) formulations.

The amount of styrene necessary to dilute laminating resins, such as unsaturated polyester resins, to an appropriate application viscosity (~250 cps) is of concern from an environmental and safety viewpoint. Typical laminating resins in this art require between about 35% and 60% styrene. Attempts to address this concern have led to developments that are commercially expensive to implement.

The parts produced from laminating resins generally are referred to as fiber-reinforced composite parts. The reinforcing fiber includes, inter alia, glass, carbon, polymeric and like fibers. Such fiber-reinforced parts can be made from a variety of materials and by several processes. The processes for making fiber-reinforced composites can be divided into two general types: closed-mold and open-mold processes. In a closed-mold process the composite part is fabricated in a manner in which the resin prior to cure is not exposed to the ambient environment. Common closed-mold processes include sheet molding, bulk molding structural reaction injected molding (SRIM), resin transfer molding (RTM), and various vacuum-assisted molding processes. Styrene emissions are of lesser concern in closed molding processes since uncured resin is not exposed to the environment.

Open-mold processes are the second general classification of molding processes. Common open-mold processes include spray-up, hand lay-up, rotational molding, filament winding, and the like. In open-mold processes one side of the laminate remains exposed to the environment. Thus, the styrene in the laminating resin can evaporate. Styrene has been classified as a hazardous air pollutant (HAP). Reducing the styrene content of laminating resins is believed to result in lower HAP emissions and a cleaner environment.

Spray-up is commonly used to fabricate parts using a laminating resin and fiberglass reinforcement. In this process a "chopper-gun" is used. The surface of a mold is sprayed with a mixture of laminating resin and chopped glass fiber. Just prior to application, additives are mixed into the resin to promote hardening (i.e., cure). Once the mold surface is covered with an appropriate amount of glass fiber and resin the surface can be rolled to help entrapped air escape. This step is called "rollout". Alternatively, mats of woven fiberglass can be used. The laminating resin then is applied to the mat and the surface is rolled to remove entrapped air. In either fashion multiple layers can be built up. These layers can be of the same or different material. Since the mold can have uneven surfaces, it is desirable that the laminating resin possesses the ability to fill the resulting voids. Also, it is important that the resin remain uncured and fluid for sufficient time to permit placing of the second layer into contact with the first layer. A resin that hardens too quickly does not permit flexibility in the fabrication process. Thus, the length of time the resin is fluid is measured and is referred to as "gel-time". After the laminating resin has gelled it is no longer fluid but not hard. Hardening (cure) takes place after the resin has gelled. Usually the part is sufficiently hard so that it can be removed from the mold within 2 to 24 hours of gelation. Hardening times can be shortened by placing the composite parts in an oven maintained at, e.g., 50°–100° C. for, e.g., 1–3 hours. When large parts are being fabricated the use of an oven may not be practical.

BRIEF SUMMARY OF THE INVENTION

A composite part composed of at least one fiber reinforced ply by combining fiber reinforcement with a laminating resin composition then causing the laminating resin composition to harden (i.e., cure) at ambient or elevated temperature. The laminating resin composition is composed of a polyol that has been end-terminated with an alkyl (meth) acrylate group and diluted with less than about 35 wt-% styrene. Additives are added to the laminating resin composition to adjust shelf-life and gel-time. Additionally, additives are added to harden or cure the resin. In making the laminating resin, unreacted alkyl (meth)acrylate can be reacted with an epoxy to push the reaction to completion.

DETAILED DESCRIPTION OF THE INVENTION

The polyol materials are based on macromolecules with a polyester or polyether backbone. In the polyester polyols, a dibasic acid is condensed with a polyhydridic alcohol or glycol. The diacid can be saturated, aromatic, or contain unsaturation. Polyols based on the reaction product of alkyleneoxides (e.g., ethylene oxide) and bis-phenol A can also be used alone or in combination with the polyester polyol. The polyol, then, is capped with an (meth)acrylate. Cross-linking this acrylated polyester backbone, through the terminal acrylate component, most commonly with styrene, produces a three-dimensional structure. Further information on polyesters can be found, for example, by reference to Kirk-Othmer, *Encyclopedia of Chemical Technology*, 3d Ed., Vol. 11, pp 129–138, John Wiley & Sons, New York, N.Y. (1982), the disclosure of which is expressly incorporated herein by reference. In addition to (meth)acrylate groups, (alkyl)acrylate groups can be used as the capping agents with alkyl groups ranging from $C_1$ to $C_8$ groups. In keeping with terminology in this field, the parenthetical group is optional. Thus, "(alkyl)acrylate" means "acrylate and alkylacrylate".

Examples of dibasic acids well known in the polyester art include, for example, glutaric acid, adipic acid, pimelic acid, suberic acid, azelaic acid, sebasic acid, dodecanedioic acid, tetrahydrophthalic acid, phthalic acid, isophthalic acid, orthophthalic acid, terephthalic acid, maleic (and fumaric) acid, corresponding anhydrides, and the like, and mixtures thereof. Preferably, such suitable dicarboxylic acids contain from about 4 to 12 carbon atoms.

Suitable such glycols include virtually any known difunctional dihydric alcohol, for example, alkylene glycols, typically ranging from about 2 to 8 carbon atoms (including cycloalkylene glycols). Illustrative of such diols are ethylene glycol, 1,3-propanediol, 1,3-butanediol, 1,4-butanediol, 1,5-pentanediol, 1,6-hexanediol, 1,2-propanediol, 1,3- butanediol, 2,3-butanediol, 1,3-pentanediol, 1,2-hexanediol, 3-methyl pentane-1,5-diol, 1,4-cyclohexanedimethanol, neopentylglycol, cyclohexane dimethanol, 2,2,4-trimethyl pentanediol, 2-methyl-1,3-propanediol, bis-phenol A, trimethylol ethane, trimethylol propane, dicyclopentadiene glycol, dibrominepentyl glycol, and the like, and mixtures thereof. Diethylene glycol, polypropylene glycol, dipropylene glycol, triethylene glycol, tripropylene glycol, polyethylene glycol, and the like additionally can be used as necessary, desirable, or convenient.

Generally, the temperature of esterification is maintained in the range of about 150°–230° C. and an esterification catalyst is used. Such catalysts are conventional and include, for example, titanium tetrachloride, zinc acetate, zinc oxide, stannous oxylate, dibutyl tin oxide, and the like. Conventional color stabilizers, e.g., trilauryl phosphite or the like, also can be included in the reaction mixture.

The polyester resin then can be end-capped with methacrylic acid (or anhydride). Broadly, alkylacrylic acids can be used, but for ease in condensing water from the system, methacrylic acid is preferred. A molar excess of methacrylic acid is used with conventional condensation reaction conditions prevailing. Further information on this condensation reaction can be found in Japanese Patents Nos. JP 07007604 and 07103291 and Japanese Patent Applications Nos. 49040329 and 63210143, the disclosures of which are expressly incorporated herein by reference.

At around 80% conversion or so, the condensation reaction can stall. Thus, an epoxide can be added to the reaction mixture to react with unreacted methacrylate monomer to speed up the reaction and carry it to completion, as well as to add additional resinous solids to the ultimate laminating composition. A variety of epoxy resins can be used, such as, for example, polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxycyclohexyl)propane; polyglycidyl ethers of aliphatic and aromatic polycarboxylic acids, such as, for example, oxalic acid, succinic acid, glutaric acid, terephthalic acid, 2,6-napthalene dicarboxylic acid, and dimerized linoleic acid; polyglycidyl ethers of polyphenols, such as, for example, bis-phenol A, bis-phenol F, 1,1-bis(4-hydroxyphenyl)ethane, 1,1-bis(4-hydroxyphenyl)isobutane, and 1,5-dihydroxy napthalene; modified epoxy resins with acrylate or urethane moieties; glycidlyamine epoxy resins; and novolak resins; and the like and mixtures thereof.

It should be understood that, while the methacrylated laminating resins can be used alone to fabricate fiber-reinforced parts, they also can be mixed with other laminating resins to improve performance and/or to enhance their cure. Examples of suitable resins that can be mixed with the methacrylated laminating resins include, for example, unsaturated polyester resins (including those made with dicyclopentadiene, DCPD), vinyl ester resins, acrylic resins, polyether resins, polyamine resins, polyamide resins, alkyd resins, and the like and mixtures thereof. Additives incorporated into the methacrylated polyester material are conventional in nature. Accordingly, suitable curing agents, accelerating agents, and the like are incorporated. Pigments, release agents, plasticizers, low shrink additives, surface enhancers, and the like also are used as is necessary, desirable, or convenient in conventional fashion.

Application of the laminating resin composition most often is by spray application techniques. Thus, the viscosity of the methacrylated polyester needs to be suitable therefor. Roller coating application requires yet a different application viscosity. Broadly, application viscosities should be less than about 1000 cps, generally less than about 500 cps, and less than about 250 cps for spray application of the methacrylated polyester.

While the methacrylated polyester will cure over time at ambient temperature, often the laminate will be heated to about 60° to 150° C. for times ranging from about 5 to about 500 minutes. Such heating schedules are practiced at the expense of line speed and energy costs.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLES

Example 1

Preparation of Methacrylated Polyester Resin

A 2-liter kettle fitted with a mantel, Vigeroux column, gas inlet, condenser, and Dean Stark trap was charged with the following ingredients:

TABLE 1

| Ingredient # | Ingredient | Weight Wanted (g) | Weight Charged (g) |
| --- | --- | --- | --- |
| 1 | Polyethylene terephthalate polymer | 288.55 | 288.69 |
| 2 | 2-Methyl-1,3-propanediol | 283.88 | 284.00 |
| 3 | Zinc Acetate | 0.860 | 0.8643 |
| 4 | Hydroquinone (20% solution in ethylene glycol/methanol | 0.215 | 0.2682 |
| 5 | Polyethylene terephthalate polymer | 288.55 | 289 |
| 6 | Triphenylantimony | 6.85 | 6.8592 |
| 7 | MEHQ | 1.52 | 1.5237 |
| 8 | Methacrylic anhydride | 659.17 | 659.17 |
| 9 | Methacrylic anhydride | 288.60 | 288.77 |

The first 4 ingredients were charged into the kettle and heated to 410° F. When the reaction ingredients became homogeneous, ingredient 5 was added and a temperature of 410° F. was maintained until 4 hours after the reaction mixture was homogeneous. The reaction mixture was cooled and Ingredients 6–8 then were charged into the kettle and heated to 235° F. with an air/nitrogen (50/50) sparge, and a condenser was directly connected to the reactor. After 4.5 hours reaction time, Ingredient 9 was added to the reaction mixture and a temperature of 235° F. was maintained for 7 hours. The resin then was exposed to a reduced pressure using a vacuum pump to remove the methacrylic acid. Distillation continued until an acid value of less than 25 was obtained. The final polyester product (6720-24) possessed an acid value of 8.1, a hydroxyl value of 3.6, and 85.4% non-volatiles solids.

Example 2

Testing of Laminating Resin Composition of Example 1

Neat resin castings were prepared from methacrylated polyester of Example 1 at 78.7% nv solids (6720-124-1) and at 85.4% nv solids (6720-124-2) by curing a mixture of the resin and 1% benzoyl peroxide and 0.5% tertiary butyl perbenzoate between two glass plates separated by a ⅛" silicone rubber gasket. The following cure cycle was used: 160° F. for 2 hours, then 200° F. for 1 hour, then 280° F. for 2 hours.

The castings were tested as follows:

Tensile (ASTM D-638 m MAT-2202)

Instron Series IX Automated Tester

Sample rate: 5 pts/sec

Crosshead speed: 0.2000 in/min $2^{nd}$ Crosshead speed: 0.000 in/min

Full scale load range: 10000 lbf

Heat Distortion Temperature Under Load (ASTM D-648, MAT-2250)

Maximum fiber stress: 264 psi

Immersion medium: silicone oil

The following results were recorded:

TABLE 2

Tensile Testing Results-Sample 6720-124-1

| Sample # | Max. Tensile Strength (psi) | Modulus (ksi) | Elongation at Max. Load (%) | Elongation at Break (%) | Width (in) | Thickness (in) |
|---|---|---|---|---|---|---|
| 1 | 8721 | 474.4 | 2.34 | 2.67 | 0.502 | 0.110 |
| 2 | 10069 | 474.6 | 2.85 | 3.22 | 0.514 | 0.105 |
| 3 | 10951 | 470.6 | 3.05 | 3.67 | 0.508 | 0.109 |
| 4 | 10308 | 470.0 | 2.99 | 2.99 | 0.508 | 0.107 |
| 5 | 10003 | 490.2 | 2/51 | 3/22 | 0.507 | 0.109 |
| Mean | 10010 | 475.9 | 2.75 | 0.108 | 0.503 | 0.108 |
| SD* | 812 | 8.2 | 0.31 | 0.37 | 0.004 | 0.002 |

*SD is standard deviation

TABLE 3

Tensile Testing Results-Sample 6720-124-2

| Specimen # | Max. Tensile Strength (psi) | Modulus (ksi) | Elongation at Max. Load (%) | Elongation at Break (%) | Width (in) | Thickness (in) |
|---|---|---|---|---|---|---|
| 1 | 11592 | 481.5 | 3.61 | 3.61 | 0.502 | 0.124 |
| 2 | 10695 | 489.0 | 3.02 | 3.76 | 0.504 | 0.125 |
| 3* | 9575 | 451.8 | 2.58 | 2.58 | 0.504 | 0.123 |
| 4 | 11239 | 507.9 | 3.07 | 3.07 | 0.506 | 0.124 |
| 5 | 10759 | 486.8 | 3.07 | 3.73 | 0.506 | 0.124 |
| Mean | 10759 | 486.8 | 3.00 | 3.35 | 0.504 | 0.124 |
| SD | 764 | 22.4 | 0.40 | 0.51 | 0.002 | 0.001 |

TABLE 4

HDT Under Load Results

| Sample | Specimen # | Temp (° C.) | Temp (° F.) |
|---|---|---|---|
| 6720-124-1 | 1 | 116.5 | 241.7 |
|  | 2 | 115.1 | 239.2 |
|  | Mean | 115.6 | 240.4 |
|  | SD | 1.0 | 1.8 |
| 6720-124-2 | 1 | 116.1 | 241.0 |
|  | 2 | 115.1 | 239.2 |
|  | Mean | 115.6 | 240.1 |
|  | SD | 0.7 | 1.3 |

TABLE 5

Viscosity at Different Styrene Contents

| Sample | % Styrene | Viscosity (cps) |
|---|---|---|
| 6720-124 | 0 | 2195 |
| 6720-124 | 10 | 280 |

These results demonstrate that this low styrene material has both excellent physical and thermal properties as well as a usable viscosity for spray up applications.

Example 3

Post-reaction of Excess Methacrylic Acid with Epoxy Resin

The condensation reaction between methacrylic acid and a PET-based polyol (PET/2-methyl-1,3-propane diol/neopentyl glycol adduct) was run with an excess of methacrylic acid in toluene solvent with triphenyl antimony, p-benzoquinone, and methane sulfonic acid catalysts. Once esterification had slowed down, the acid catalyst (methane sulfonic acid, MSA) was neutralized with tetramethyl ammonium hydroxide and toluene was removed by distillation. Then, a bis-phenol A epoxy resin (EPON® 828 difunctional bis-phenol A/epichlorhydrin liquid epoxy resin, 185–192 epoxide equivalent weight, 110–150 poise viscosity @ 25° C., 1.16 g/ml density @ 25° C., Resolution Performance Products, LLC, Houston, Tex.) was added to react with residual (excess and unreacted) methacrylic acid. This adhesive neat is sample 6702-184. Another resin, 6702-187ST, was prepared in the same manner with an additional processing step in which volatile components of the resin were removed by vacuum stripping.

These two methacrylate capped laminating resins were blended with an unsaturated polyester resin (AROPOL™ 8014, available from Ashland Chemical, 5200 Blazer Parkway, Dublin, Ohio 43017) and the styrene content was adjusted with styrene to 28% (Example 3-A and 3-B). A comparative laminating resin (3-Comp.) was prepared by mixing AROPOL™ 914 vinyl ester resins (available from Ashland Chemical, 5200 Blazer Parkway, Dublin, Ohio 43017) with the AROPOL™ 8014 and the viscosity was adjusted to 200 cps with styrene. The two experimental laminating resin blends and the comparative resin blend were promoted and cured using methyl ethyl ketone peroxide (Lupersol DDM-9 available from Elf Atochem North America, Inc. 2000 Market St. Philadelphia, Pa. 19103, labeled as MEK-P in the table). After a post cure the castings were subjected to testing with the results summarized in Table 6 being recorded.

TABLE 6

Tensile, Flexural and Water-boil Data for Casting ID

| | Example | | |
|---|---|---|---|
| | 3-Comp. | 3-A | 3-B |
| Casting ID (6824-) | 75-203 | 63-209 | 63-208 |
| Aropol 8014 | 50% | 50% | 50% |
| Aropol 914 | 50% | — | — |
| 6702-184 | — | 50% | — |
| 6702-187ST | — | — | 50% |
| Styrene | 34% | 28% | 28% |
| Viscosity (Brookfield @ 25° C.) | 200 | 148 | 170 |
| Test Data @ 140° F. Post Cure | | | |
| Barcol Hardness | 46 | 47 | 44 |
| Tensile Strength (psi) | 9,431 | 10,171 | 10,493 |
| Tensile Modulus (ksi) | 514 | 535 | 535 |
| Elongation at break | 2.22% | 2.34% | 2.49% |
| Flexural strength (psi) | 17,921 | 16,534 | 16,575 |
| Flexural modulus (ksi) | 501 | 514 | 507 |
| Water @ 212° F. 6-d | | | |
| Absorption | 2.00% | 2.16% | 1.79% |
| Extraction | −0.08% | 0.01% | −0.01% |
| Physical change* | 0 | 1 | 0 |
| Test data @ 300° F. Post-Cure | | | |
| Barcol hardness | 48 | 48 | 45 |
| HDT (° C.) | 111 | 94 | 100 |

*Water-Boil-PC: 0 = no change; 9 = severe attack; on re-dried samples.

The laminating resin derived from the methacrylated polyester had a lower viscosity and a lower styrene content relative to the Comparative Example. Additionally, the tensile and flexural properties and water-boil properties of the inventive samples are as good as those of the Comparative resin. The higher HDT of Example 3-B shows that vacuum stripping can be used to improve HDT performance of the laminating resin.

Example 4

Properties of Polyester-based Dimethacrylates

Additional polyesters were synthesized using various glycols and dibasic acids, and then capped with dimethacrylic acid. The amount of styrene added to the resins was varied. The results recorded are set forth below.

TABLE 7

Polyester Based Dimethacrylates Cured with 1% Benzoyl Peroxide and 0.5% t-butyl perbenzoate (TBPB)

| Styrene (%) | Glycol/ Acid* | Viscosity (cps) | Tensile Strength (psi) | Tensile Modulus (ksi) | Elongation (%) | HDT (° C.) |
|---|---|---|---|---|---|---|
| 6.7 | 2 EG/P | 1800 | 13784 | 665 | 2.70 | 67.0 |
| 16.7 | 2 EG/P | 211 | 13970 | 631 | 3.17 | 69.5 |
| 0 | 2.2 EG/P | 825 | 10593 | 786 | 1.60 | 75.6 |
| 6.0 | 2.2 EG/P | 248 | 10889 | 739 | 1.74 | 78.2 |
| 0 | 2 DEG/P | 594 | 8483 | 431 | 9.71 | 45.4 |
| 5.3 | 2 DEG/P | 248 | 9221 | 451 | 8.11 | 47.5 |
| 0 | 2.2 EG/I | 1430 | 9296 | 651 | 1.50 | 108 |
| 7.9 | 2.2 EG/I | 277 | 9559 | 636 | 2.00 | 115 |
| 0 | 2 DEG/I | 791 | 11317 | 516 | 5.25 | 50.6 |
| 6.6 | 2 DEG/I | 261 | 11578 | 544 | 6.79 | 53.0 |
| 0 | 1.05 MPdiol/ PET | 2195 | 10010 | 476 | 3.15 | 116 |
| 10 | 1.05 MPdiol/ PET | 270 | 10759 | 487 | 3.35 | 116 |

*EG is ethylene glycol
DEG is diethylene glycol
MPDiol is 2-methyl-1,3-propane diol
P is phthalic acid
I is isophthalic acid Example 5

Sample 6824-133-101

The following materials were charged to a 2-L reaction vessel: 800 g of polyester polyol prepared by the digestion of poly(ethylene terephthalate) with 2-methyl-1,3-propanediol and trimethylolpropane, TMP, 523 g of methacrylic acid, 106 g of xylene, 2.6 g of triphenyl antimony, 0.33 g of p-benzoquinone, and 6.5 g of p-toluenesulfonic acid monohydrate. The mixture was heated to 121° C. and water of reaction was removed by distillation as a xylene/water azeotrope. During the first 8 hours the water was removed and the xylene was recycled back into the reactor. After 8 hours xylene recycling was discontinued. After 11 hours, the mixture was cooled to 80° C. and 13.8 g of tetramethyl ammonium hydroxide (25% aqueous solution) were added. The mixture was weighed (1,297 g) and the acid value (AV) was measured (92 mg KOH/g).

Bis-phenol A epoxy (312 g, Epon 828) was added to the reaction vessel. The amount of bis-phenol A used was calculated so that the AV would be reduced to about 20. The mixture was heated to 121° C. until the AV had decreased to 21 and the epoxy value to 2.4. The final product had a viscosity of 10,600 cps and could be used for making laminates after addition of about 21% styrene.

Example 6

Sample 6824-144-101

The following materials were charged to a 2-L reaction vessel: 800 g of polyester polyol (prepared by condensing, at 202° C. with removal of water, a mixture of tetrahydrophthalic acid, tetrahydrophthalic acid anhydride, neopentyl glycol, 1,6-hexanediol and trimethylol propane, TMP), 622.6 g of methacrylic acid, 114 g of xylene, 3.1 g of triphenyl antimony, 0.36 g of p-benzoquinone, and 7.0 g of p-tolunesulfonic acid monohydrate. The mixture was heated to 121° C. and water of reaction was removed by distillation as a xylene/water azeotrope. During the first 8 hours the water was removed and the xylene was recycled back into the reactor. After 8 hours, xylene recycling was discontinued. After 11 hours, the mixture was cooled to 80° C. and 14.8 g of tetramethylammonium hydroxide (25% aqueous solution) were added. The mixture was weighed (1,361 g) and the acid value (AV) was measured (64 mg KOH/g).

Bis-phenol A epoxy (201 g, Epon 828) was added to the reaction vessel. The amount of bis-phenol A used was calculated so that the AV would be reduced to about 20. The mixture was heated to 121° C. until the AV had decreased to 19 and the epoxy value to 3.6. The final product had a viscosity of 1,220 cps.

Example 7

Preparation of Laminates from 6824-144-101 (Best Mode)

The material of Example 6 (392 g) was diluted with styrene (58 g) and the resulting solution was filtered to remove suspended solids. To the filtered solution were added the following (per 100 g of filtered resin) 0.4 g 6% cobalt NAP-ALL (available from OM Group, Inc., 2301 Scranton Rd., Cleveland, Ohio 44113) 0.1 g of N,N-dimethylaniline (available from Sigma-Aldrich, P.O. Box 2060, Milwaukee, Wis. 53201), 0.03 g BYK® A555 (available from BYK-Chemie, 524 South Cherry St., Wallingford, Conn. 06492) and 0.08 g of a 10% solution of hydroquinone in propylene glycol to prepare a laminating resin. This laminating resin had a viscosity of 135 cps and contains about 13% styrene.

Lupersol DDM-9 (1.8 g) curative was added to a 120 g sample of the laminating resin and was used to make a 2-ply and a 5-ply laminate (with 1.5 oz chopped-glass mat as the reinforcement). The laminates were allowed to cure at room temperature for 90 hours and then the Barcol hardness was measured. Harness values (top/bottom) were as follows: 41/47—2-ply laminate, 47/53—5-ply laminate. These results compare favorably with data obtained using a conventional unsaturated polyester resin (UPR). However, the conventional UPR had a styrene content of 46% and a viscosity of 266 cps. Laminates prepared from this resin had the following hardness values (top/bottom) after 90 hours: 38/47—2-ply laminate, 40/49—5-ply laminate. These results show that the methacrylated polyester resins can be used to make laminates that cure well at ambient conditions but contain considerably less styrene than conventional UPR laminating resins.

We claim:

1. A laminate ply formed from a first fiber-reinforcement joined by a laminating resin composition, said laminating resin composition comprising the cured residue of:
   one or more of a saturated or aromatic polyester resin being end-terminated by esterification with one or more of an (alkyl)acrylic acid or an (alkyl)acrylic acid anhydride and diluted with less than about 35 wt-% styrene to spray application viscosity of less than about 500 cps.

2. The laminate ply of claim 1, wherein said one or more of an (alkyl)acrylic acid or an (alkyl)acrylic acid anhydride is one or more of methacrylic acid or methacrylic anhydride.

3. The laminate of ply claim 1, wherein said alkyl groups of said one or more of an (alkyl)acrylic acid or an (alkyl)acrylic acid anhydride range from $C_1$ to $C_8$ groups.

4. The laminate of ply claim 1, wherein said polyester resin is formulated from a dibasic acid being one or more of glutaric acid, adipic acid, pimelic acid, suberic acid, azelaic acid, sebasic acid, dodecanedioic acid, tetrahydrophthalic acid, phthalic acid, isophthalic acid, orthophthalic acid, terephthalic acid, or their corresponding anhydrides; and a glycol being one or more of ethylene glycol, 1,3-propanediol, 1,3-butanediol, 1,4-butanediol, 1,5-pentanediol, 1,6-hexanediol, 1,2-propanediol, 2,3-butanediol, 1,3-pentanediol, 1,2-hexanediol, 2-methyl-1,3-propanediol, 3-methyl pentane-1,5-diol, 1,4-cyclohexanedimethanol, neopentylglycol, cyclohexane dimethanol, 2,2,4-trimethyl pentanediol, bis-phenol A, trimethylol ethane, trimethylol propane, dicyclopentadiene glycol, dibrominepentyl glycol, diethylene glycol, polypropylene glycol, dipropylene glycol, triethylene glycol, or tripropylene glycol, polyethylene glycol.

5. The laminate ply of claim 1, wherein end-terminated polyester resin is further reacted with an epoxide to react with unreacted one or more of an (alkyl)acrylic acid or an (alkyl)acrylic acid anhydride to speed up the reaction and carry it to completion.

6. The laminate ply of claim 5, wherein said epoxide is one or more of glycidyl ethers of ethylene glycol, triethylene glycol, 1,2-propylene glycol, 1,5-pentanediol, 1,2,6-hexanetriol, glycerol, and 2,2-bis(4-hydroxycyclohexyl) propane; polyglycidyl ethers of oxalic acid, succinic acid, glutaric acid, terephthalic acid, 2,6-napthalene dicarboxylic acid, and dimerized linoleic acid; glycidyl ethers of bis-phenol A, bis-phenol F, 1,1-bis(4-hydroxyphenyl)ethane, 1,1-bis(4-hydroxyphenyl)isobutane, 1,5-dihydroxy napthalene; modified epoxy resins with acrylate or urethane moieties; glycidlyamine epoxy resins; poly(bisphenol A-co-epichlorhydrin); or glycidyl ethers of novolak resins.

7. The laminate ply of claim 1, wherein said first fiber reinforcement is one or more of glass, carbon, a polymeric fiber.

8. A laminate formed from a first fiber-reinforced ply joined by a laminating resin composition to a second fiber-reinforced ply, said laminating resin composition comprising the cured residue of:
   one or more of a saturated or aromatic polyester resin being end-terminated by esterification with one or more of an (alkyl)acrylic acid or an (alkyl)acrylic acid anhydride end diluted with less than about 35 wt-% styrene to spray application viscosity of less than about 500 cps.

9. The laminate of claim 8, wherein said one or more of an (alkyl)acrylic acid or an (alkyl)acrylic acid anhydride is one or more of methacrylic acid or methacrylic anhydride.

10. The laminate of claim 8, wherein said alkyl groups of said one or more of an (alkyl)acrylic acid or an (alkyl)acrylic acid anhydride range from $C_1$ to $C_8$ groups.

11. The laminate of claim 8, wherein said polyester resin is formulated from a dibasic acid being one or more of glutaric acid, adipic acid, pimelic acid, suberic acid, azelaic acid, sebasic acid, dodecanedioic acid, tetrahydrophthalic acid, phthalic acid, isophthalic acid, orthophthalic acid, terephthalic acid, or their corresponding anhydrides; and a glycol being one or more of ethylene glycol, 1,3-propanediol, 1,3-butanediol, 1,4-butanediol, 1,5-pentanediol, 1,6-hexanediol, 1,2-propanediol, 2,3-butanediol, 1,3-pentanediol, 1,2-hexanediol, 2-methyl-1,3-propanediol, 3-methyl pentane-1,5-diol, 1,4-cyclohexanedimethanol, neopentylglycol, cyclohexane dimethanol, 2,2,4-trimethyl pentanediol, bis-phenol A, trimethylol ethane, trimethylol propane, dicyclopentadiene glycol, dibrominepentyl glycol, diethylene glycol, polypropylene glycol, dipropylene glycol, triethylene glycol, or tripropylene glycol, polyethylene glycol.

12. The laminate of claim 8, wherein end-terminated polyester resin is further reacted with an epoxide to react with unreacted one or more of an (alkyl)acrylic acid or an (alkyl)acrylic acid anhydride to speed up the reaction and carry it to completion.

13. The laminate of claim 12, wherein said epoxide is one or more of glycidyl ethers of ethylene glycol, triethylene glycol, 1,2-propylene glycol, 1,5-pentanediol, 1,2,6-hexanetriol, glycerol, and 2,2-bis(4-hydroxycyclohexyl) propane; polyglycidyl ethers of oxalic acid, succinic acid, glutaric acid, terephthalic acid, 2,6-napthalene dicarboxylic acid, and dimerized linoleic acid; glycidyl ethers of bis-phenol A, bis-phenol F, 1,1-bis(4-hydroxyphenyl)ethane, 1,1-bis(4-hydroxyphenyl)isobutane, 1,5-dihydroxy napthalene; modified epoxy resins with acrylate or urethane moieties; glycidlyamine epoxy resins; poly(bisphenol A-co-epichlorohydrin); or glycidyl ethers of novolak resins.

14. The laminate or claim 8, wherein said first fiber reinforcement is one or more of glass, carbon, a poylmeric fiber.

15. A method for laminating first fiber-reinforced ply joined to a second fiber-reinforced ply with a laminating resin composition, which comprises the steps of:
   (a) coating a surface of said first ply with a laminating resin composition comprising one or more of a saturated or aromatic polyester resin being end-terminated by esterification with one or more of an (alkyl)acrylic acid or an (alkyl)acrylic acid anhydride and diluted with less than about 35 wt-% styrene to spray application viscosity of less than about 500 cps; and
   (b) joining said coated first ply surface with a surface of said second ply; and
   (c) curing said adhesive.

16. The method of claim 15, wherein said one or more of an (alkyl)acrylic acid or an (alkyl)acrylic acid anhydride is one or more of methacrylic acid or methacrylic anhydride.

17. The method of claim 15, wherein said polyester resin is formulated from a dibasic acid being one or more of glutaric acid, adipic acid, pimelic acid, suberic acid, azelaic acid, sebasic acid, dodecanedioic acid, tetrahydrophthalic acid, phthalic acid, isophthalic acid, orthophthalic acid, terephthalic acid, or their corresponding anhydrides; and a glycol being one or more of ethylene glycol, 1,3-propanediol, 1,3-butanediol, 1,4-butanediol, 1,5-pentanediol, 1,6-hexanediol, 1,2-propanediol, 2,3-butanediol, 1,3-pentanediol, 1,2-hexanediol, 2-methyl-1,3-propanediol, 3-methyl pentane-1,5-diol, 1,4-cyclohexanedimethanol, neopentylglycol, cyclohexane dimethanol, 2,2,4-trimethyl pentanediol, bis-phenol A, trimethylol ethane, trimethylol propane, dicyclopentadiene glycol, dibrominepentyl glycol, diethylene glycol, polypropylene glycol, dipropylene glycol, triethylene glycol, or tripropylene glycol, polyethylene glycol.

18. The method of claim 15, wherein end-terminated polyester resin is further reacted with an epoxide to react with unreacted one or more of an (alkyl)acrylic acid or an (alkyl)acrylic acid anhydride to speed up the reaction and carry it to completion.

19. The laminate of claim 12, wherein said epoxide is one or more of glycidyl ethers of ethylene glycol, triethylene glycol, 1,2-propylene glycol, 1,5-pentanediol, 1,2,6-hexanetriol, glycerol, and 2,2-bis(4-hydroxycyclohexyl) propane; polyglycidyl ethers of oxalic acid, succinic acid, glutaric acid, terephthalic acid, 2,6-napthalene dicarboxylic acid, and dimerized linoleic acid; glycidyl ethers of bisphenol A, bis-phenol F, 1,1-bis(4-hydroxyphenyl)ethane, 1,1-bis(4-hydroxyphenyl)isobutane, 1,5-dihydroxy napthalene; modified epoxy resins with acrylate or urethane moieties; glycidlyamine epoxy resins; poly(bisphenol A-co-epichlorohydrin); or glycidyl ethers of novolak resins.

20. The method of claim 15, wherein said first fiber reinforcement is one or more of glass, carbon, a poylmeric fiber.

* * * * *